July 2, 1929.  W. A. REVILLE  1,719,520
TRANSMISSION GEAR LOCK
Filed Aug. 18, 1927
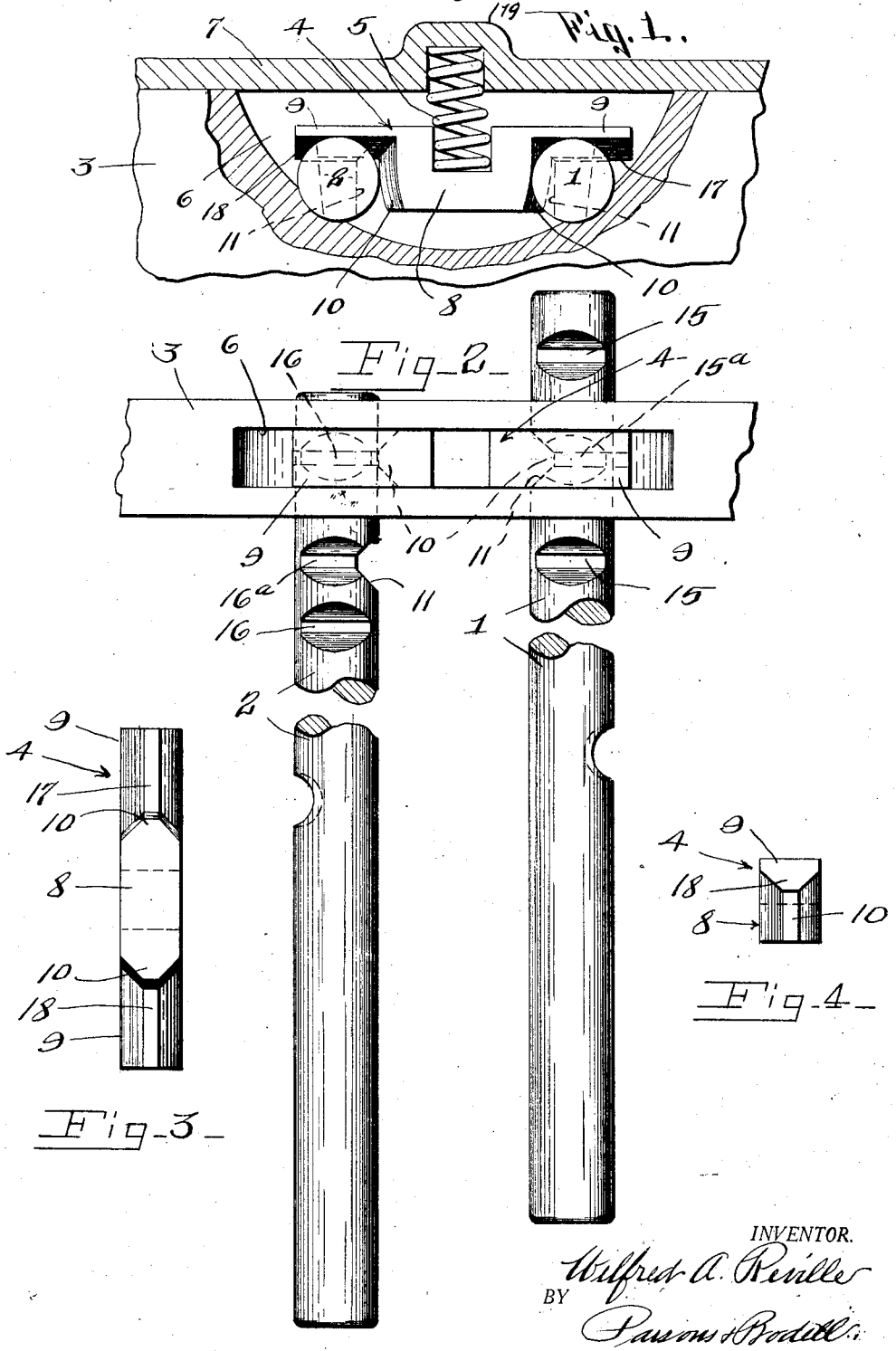
INVENTOR.
Wilfred A. Reville
BY Parsons & Bodell
ATTORNEYS.

Patented July 2, 1929.

1,719,520

UNITED STATES PATENT OFFICE.

WILFRED A. REVILLE, OF SYRACUSE, NEW YORK, ASSIGNOR TO BROWN-LIPE GEAR COMPANY, OF SYRACUSE, NEW YORK, A CORPORATION OF NEW YORK.

TRANSMISSION-GEAR LOCK.

Application filed August 18, 1927. Serial No. 213,923.

This invention has for its object a locking means for shifter rods such as the shifter rods of the conventional change speed transmission gearing commonly used in motor vehicles, which locking means consists of a minimum number of compactly arranged parts and performs the function of not only locking the unshifted rod in neutral position, but also impositively locking both rods in neutral position and either rod in its shifted position out of neutral.

The invention consists in the novel features and in the combinations and constructions hereinafter set forth and claimed.

In describing this invention, reference is had to the accompanying drawings in which like characters designate corresponding parts in all the views.

Figure 1 is a fragmentary vertical sectional view through a portion of a transmission gearing showing one of the walls of the casing of the gearing formed with a housing for the locking mechanism and showing the locking mechanism in elevation.

Figure 2 is a fragmentary plan view, partly broken away of parts seen in Figure 1.

Figure 3 is a plan view of the locking member.

Figure 4 is an end view thereof.

As will be understood by those skilled in the art, the change speed or transmission gearings used in automobiles and other motor vehicles comprise slide rods which operate forks coacting with shiftable gears and clutches, and but one rod being out of neutral position at any one time, the others being locked in neutral position. When all rods are in neutral position, any one of them can be selected and shifted. When any one rod is in a shifted position, that is, a position in which gears or clutches of the transmission gearing are engaged, an impositive locking means as a spring pressed poppet has been employed to hold such rod in its shifted position. As the operation of the slide rods is well known, it is thought that it is unnecessary to describe or call attention to details of the transmission gearing and it is sufficient for a complete understanding of this invention to limit the description to the coaction of the locking means and a pair of shifter rods.

This invention comprises a pair of endwise movable shifter rods shiftable in opposite directions from neutral and locking mechanism shiftable by the movement of either rod from neutral to positively lock the other rod in neutral and a part thereof having an additional shifting movement, and a returning spring for resisting the additional movement, each rod and the locking mechanism coacting to effect the additional movement upon the shifting of either rod and also having means for impositively interlocking under the influence of the spring when the rods are in neutral position and also when either rod is in any shifted position.

The locking mechanism preferably includes a single rigid member which coacts with both rods and is bodily shiftable laterally relatively to the rods by the movement of either rod from neutral to positively lock the other rod in neutral and is also movable or tiltable against the action of the spring at an angle to its bodily shifting movement by the shifting movement of either rod from neutral.

1 and 2 designate the shifter rods suitably mounted in the case of a change speed transmission gearing in any well known manner, one wall as the front wall 3 of said casing being shown and rods sliding through said wall.

The locking means comprises a single rigid member 4 for coacting with the rods 1 and 2 and a spring 5 for resisting one of the movements of the member 4. The member 4 and spring 5 are located in a suitable housing, this being provided by forming a chamber or recess 6 in the wall 3 of the case, which recess opens through the upper edge of the wall and the open side of the recess is closed by the usual cover 7 of the gear case, the cover being held in position in any suitable manner usually by cap screws. The locking member 4 extends transversely of the rods and has a portion 8 extending between the rods and portions 9 overlying the rods and bearing or resting thereon as the member in this embodiment of my invention, is arranged in a horizontal position.

The means operable by the shifting of either rod to operate the locking member to positively lock the other rod in neutral position includes interlocking parts as projections and notches which have a camming action during the sliding movement of either rod from neutral, to interlock with the other rod.

In the illustrated embodiment of my invention, the portion 8 of the locking member 4 is of greater width than the distance between the rods or is as wide as the distance between the rods plus the depth of one of the notches 11 to be presently described, and is provided with inclined or cam projections 10 on opposite sides thereof which enter complemental notches 11 on the opposing sides of the rods, these notches 11 being located in transverse alinement when both rods are in neutral position. Obviously, during shifting of either rod as the rod 2 from neutral, the inclined walls of the notch 11 acting on the coacting projection 10 will cause the member 4 to be shifted bodily laterally carrying the other projection 10 into the notch 11 of the other rod 2 and thus positively locking the other rod 2 in neutral position while the rod 1 is out of neutral position, it being understood that after the rod 1 is shifted from neutral position, its periphery engages the end of the adjacent projection 10, thus positively holding the other projection 10 in the notch 11 of the other rod 2.

The additional movement of the locking member 4 is a tilting movement at an angle to the lateral sliding or bodily movement and is effected by the shifting of either rod 1 or 2 out of neutral position, the locking member 4 when being tilted by the shifting of one rod, fulcruming on the other rod. The coacting means on each rod and the locking means for effecting the additional or tilting movement of the locking member and for impositively locking both rods in neutral position, and the shifted rod in its shifted position is arranged on the upper side of each rod or a side at an angle to that on which the notches 14 are located, and on the portions 9 of the locking member, this coacting means comprising notches and projections having a camming action.

In the illustrated embodiment of my invention, the rod 1 is provided with notches 15, 15ª on its upper face and the rod 2 with notches 16, 16ª and the portions 9 of the locking member are provided with complemental projections 17 and 18. The notches 15, 15ª on the rod 1, which when shifted from neutral produces either reverse or low speed forward, are slightly differently spaced from the notches 16, 16ª on the rod 2, which when shifted produces second speed forward and high speed. Obviously, when either rod is shifted from neutral, the contiguous portion of the member 4 will be lifted upwardly tilting the member 4 about the other rod as a fulcrum and when the shifted rod reaches its shifted position where the projection 17 or 18 is in line with one of the notches 15 or 16, the locking member will move to its normal horizontal position under the influence of its returning spring 5 and thus impositively lock the shifted rod in its shifted position. Also, when both rods are in neutral position, the projections 17 and 18 will be in the middle notches 15ª and 16ª of both rods and thus, both rods are impositively locked in neutral position. This function has heretofore been performed by separate spring pressed poppets.

The spring 5 is interposed between the cover 7 and the locking member 4 and is seated at its inner end in a depression or slot in the locking member 4 midway between the rods thereof. It is seated at its outer end in a seat or cap 19 on the cover, the spring extending through a hole in the cover. The cap is provided for the purpose of using a relatively long spring to provide for the lateral flexing of the spring without bending, when the locking member shifts laterally in either direction. This locking member is held from displacement lengthwise of the rod by the walls of the recess or chamber 6. Also, the spring is held from lateral displacement by said walls.

When more than two shifter rods are used instead of two, the first and third shifter rod constitute a pair with the middle shifter rod and there is a locking member between each pair, the locking members abutting against each other at their ends so that the lateral movement of one is transferred to the other. This feature however, forms no part of my invention and it will be understood that in so far as my invention is concerned, more than one pair of shifter rods may be employed where one rod is common to two pairs of rods.

In operation, the locking member locks both rods impositively in neutral position and when one rod is shifted out of neutral position, the locking member shifts into position interlocking engagement with the other rod and positively locks the latter in neutral position and also, the shifting of either rod tilts the locking member about the other rod until the shifted rod reaches one of its shifted positions so that the spring 5 can react and impositively interlock the locking member 4 with the shifted rod. Thus, the locking member performs not only the old function of locking either of two rods in neutral position when the other rod is shifted, but also locks both rods in neutral position and either rod in any shifted position.

What I claim is:

1. The combination with a pair of endwise movable shifter rods shiftable from neutral, of a locking member shiftable transversely of the rods by the movement of either rod from neutral to lock the other rod in neutral, a portion of said locking mechanism also having an additional movement at an angle to the transverse movement and a returning spring for resisting the additional movement, each rod and said mechanism having coacting means for effecting said additional movement upon shifting of each rod and for impositively interlocking under the influence of the spring when either rod is in a shifted position.

2. The combination with a pair of endwise movable shifter rods, each shiftable from neutral positions, of a locking mechanism shiftable laterally relatively to the rods by the movement of either rod from neutral to lock the other rod in neutral, said mechanism having a portion shiftable in a direction at an angle to the former movement and a returning spring for resisting the angular movement, each rod and said mechanism having coacting means to effect such angular movement upon shifting of the rod and also, for impositively interlocking under the influence of the spring when either rod is in neutral and when shifted from neutral position to a shifted position.

3. The combination with a pair of endwise movable shifter rods shiftable from neutral, of a locking mechanism having a bodily shifting movement effected by the movement of either rod from neutral to lock the other rod in neutral, said locking mechanism also having a tilting movement at an angle to its bodily movement and a returning spring for resisting the tilting movement and said member having coacting means for effecting the tilting movement upon shifting of said rod and for impositively interlocking when the rods are in neutral position and either rod is shifted from neutral into a shifted position.

4. The combination with a pair of endwise movable shifter rods shiftable from neutral, of a locking member shiftable laterally relatively to the rods by the movement of either rod from neutral to positively lock the other rod in neutral, said locking member also bearing at its ends on both rods and having a tilting movement about either rod as a fulcrum, a spring for resisting the tilting movement and each rod and said member having coacting means for tilting said member and impositively interlocking when the rods are in neutral and either rod is in any shifted position.

5. The combination with a pair of endwise movable shifter rods shiftable from neutral position, of a locking member shiftable by the movement of either rod from neutral, said locking member also bearing at its ends on both rods and having a tilting movement about either rod as a fulcrum, a spring thrusting against the locking member midway between the ends thereof for resisting the tilting movement, each rod and said member having coacting cam means for tilting said member and impositively interlocking when the rods are neutral and either rod is in any shifted position.

6. The combination with a pair of endwise movable shifter rods shiftable from neutral and a locking mechanism shiftable by the movement of either rod from neutral to positively lock the other rod in neutral, said locking mechanism having a portion having an additional movement at an angle to the former movement and a returning spring for resisting the angular movement, each rod and said mechanism having coacting means on opposing sides thereof for coacting with the locking mechanism and means on other sides at an angle to the opposing sides for coacting with the locking means to effect such angular movement upon the shifting of either rod and impositively interlocking under the influence of the spring when either rod is in neutral position and when shifted from neutral position to a shifted position.

7. The combination with a pair of endwise movable shifter rods shiftable in opposite directions from neutral and a single rigid locking member shiftable by the movement of either rod from neutral to positively lock the other rod in neutral, said locking member bearing at its ends on both rods and having a tilting movement about either rod as a fulcrum, a spring for resisting the tilting movement, the rods having means on their opposing faces for coacting with the locking member when the rods are in neutral position and the rods also having means on other faces at an angle to the opposing faces for coacting with the locking member to impositively lock the rods in neutral and in any shifted position, the coacting means comprising interlocking projections and notches having a camming action.

8. The combination with a pair of endwise movable shifter rods shiftable in opposite directions from neutral position, of locking means comprising a single rigid member shiftable bodily by the movement of either rod from neutral to lock the other rod in neutral, and having an additional movement at an angle to the former movement and a returning spring for resisting the additional movement, each rod and said member having coacting cam means for effecting the additional movement upon shifting of each rod and for impositively interlocking under the influence of the spring when either rod is in a shifted position.

9. The combination with a pair of endwise movable shifter rods shiftable in opposite directions from neutral, of locking mechanism, a member shiftable transversely of the rods by the movement of either rod from neutral to lock the other rod in neutral, said locking member comprising a portion having an additional movement at an angle to the transverse movement and a returning spring for resisting the additional movement, each rod and said mechanism having coacting means for effecting said additional movement upon shifting of each rod and for impositively interlocking under the influence of the spring when either rod is in a shifted position, and a housing for the locking mechanism having a chamber open at one side, a cover closing the open side, the spring being interposed between the cover and the locking mechanism.

In testimony whereof, I have hereunto signed my name, at Syracuse, in the county of Onondaga, and State of New York, this 17th day of August, 1927.

WILFRED A. REVILLE.